United States Patent
Matsubara et al.

(10) Patent No.: US 8,246,508 B2
(45) Date of Patent: Aug. 21, 2012

(54) CONTROLLER FOR VEHICLE DRIVE DEVICE

(75) Inventors: Tooru Matsubara, Toyota (JP); Takashi Ohta, Toyota (JP); Hideaki Komada, Gotenba (JP); Yukihiko Ideshio, Susono (JP); Hiroyuki Shibata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1128 days.

(21) Appl. No.: 12/091,590

(22) PCT Filed: Oct. 26, 2006

(86) PCT No.: PCT/JP2006/321343
§ 371 (c)(1), (2), (4) Date: Apr. 25, 2008

(87) PCT Pub. No.: WO2007/049680
PCT Pub. Date: May 3, 2007

(65) Prior Publication Data
US 2009/0131216 A1 May 21, 2009

(30) Foreign Application Priority Data
Oct. 26, 2005 (JP) .................................. 2005-312061

(51) Int. Cl.
*B60W 10/02* (2006.01)
*B60W 10/04* (2006.01)
(52) U.S. Cl. ............................. 477/5; 477/107; 477/111
(58) Field of Classification Search .............. 477/5, 107, 477/111, 75, 37, 39, 40
See application file for complete search history.

(56) References Cited

U.S. PATENT DOCUMENTS

| | | | | |
|---|---|---|---|---|
| 5,161,433 A | * | 11/1992 | Sakakibara et al. | 477/43 |
| 6,175,785 B1 | * | 1/2001 | Fujisawa et al. | 701/22 |
| 6,524,217 B1 | * | 2/2003 | Murakami et al. | 477/5 |
| 6,666,793 B2 | * | 12/2003 | Narita et al. | 477/40 |
| 6,715,572 B2 | * | 4/2004 | Shimabukuro et al. | 180/65.6 |
| 7,217,221 B2 | * | 5/2007 | Sah et al. | 477/3 |

FOREIGN PATENT DOCUMENTS

| | | |
|---|---|---|
| JP | 5 10431 | 1/1993 |
| JP | 6 98419 | 4/1994 |
| JP | 10 23607 | 1/1998 |

(Continued)

*Primary Examiner* — J. Allen Shriver, II
*Assistant Examiner* — James M Dolak
(74) *Attorney, Agent, or Firm* — Oblon, Spivak, McClelland, Maier & Neustadt, L.L.P.

(57) ABSTRACT

A vehicle drive unit control system. The vehicle includes a prime mover arranged on a power transmission route from a continuously variable transmission to a wheel, a clutch mechanism arranged on a first route from the prime mover to the wheel, and a shift range or shift position can be shifted selectively between a drive range or drive position where a power can be transmitted through the first route and a non-drive range or non-drive position where a power cannot be transmitted through the first route. The control system includes a vehicle speed control demand judging mechanism judging a vehicle speed control demand in case of shifting the shift range or shift position from the non-drive range or non-drive position to the drive range or drive position; and a prime mover controller controlling torque of the prime mover based on the judged vehicle speed control demand.

21 Claims, 7 Drawing Sheets

FOREIGN PATENT DOCUMENTS

| | | |
|---|---|---|
| JP | 2000 175311 | 6/2000 |
| JP | 2002 256920 | 9/2002 |
| JP | 2002 271917 | 9/2002 |
| JP | 2003 127681 | 5/2003 |
| JP | 2005 256883 | 9/2005 |
| JP | 2005 273900 | 10/2005 |

* cited by examiner

|  | C1 | C2 | B1 | B2 |
|---|---|---|---|---|
| 1st | ○ |  |  | ○ |
| 2nd | ○ |  | ○ |  |
| 3rd | ○ | ○ |  |  |
| 4th | ○ | ○ |  |  |
| R |  | ○ |  | ○ |
| N |  |  |  |  |

Fig.8

CONTROLLER FOR VEHICLE DRIVE DEVICE

TECHNICAL FIELD

This invention relates to a control system for a drive unit of a vehicle, in which a clutch mechanism is arranged on a route from a prime mover to a wheel.

BACKGROUND ART

In recent years, a hybrid vehicle comprising an engine and a motor generator has been proposed for the purpose of saving a fuel for driving the engine, reducing noise resulting from a rotation of the engine, and reducing emission resulting from combustion of the fuel. In the hybrid vehicle, the engine and the motor are controlled on the basis of a running condition of the vehicle when the vehicle is running.

Specifically, the hybrid vehicle can be run by driving the engine in a revolution region where combustion efficiency thereof is preferable, and also by using the motor generator as a motor while halting the engine in a revolution region where the combustion efficiency of the engine is degraded. One example of a control system for a drive system thus having an engine and a motor generator is disclosed in Japanese Patent Laid-Open No. 2003-127681. According to the system disclosed in Japanese Patent Laid-Open No. 2003-127681, an output torque of an internal combustion engine is transmitted to a wheel via a planetary gear mechanism, a transmission, a propeller shaft, a differential device and a vehicle axle. The planetary gear mechanism comprises a sun gear, ring gear and a carrier, and a crankshaft of the engine is connected with the carrier. Also, a first motor/generator is provided and a rotor thereof is connected with the sun gear. The ring gear is connected with the transmission. On the other hand, a second motor/generator is provided and a rotor thereof is connected with the propeller shaft. Japanese Patent Laid-Open No. 2003-127681 describes that torque of the vehicle axle is generated by the internal combustion engine and the second motor/generator, and a transmission having a plurality of planetary gear mechanisms, a clutch and a brake is disclosed therein as an example of the transmission. A first gear position, a second gear position, a third gear position and a reverse position of the transmission are achieved by controlling an engagement and a releasing of the clutch and the brake.

However, Japanese Patent Laid-Open No. 2003-127681 fails to disclose how to control in case of shifting the shift lever of the hybrid vehicle between a drive range and a non-drive range so as to shift a power transmitting condition of the transmission. Therefore, response to transmit a driving force to the wheel may be deteriorated.

DISCLOSURE OF THE INVENTION

The present invention has been conceived noting the technical problems thus far described, and its object is to provide a control system for a drive unit of a vehicle, which is capable of preventing deterioration in a response to transmit driving force to the wheel in case of shifting a shift range or shift position between a drive range or drive position and a non-drive range or non-drive position.

In order to achieve the above-mentioned object, according to the present invention, there is provided a control system for a drive unit of a vehicle, in which a prime mover is arranged on a route from a continuously variable transmission to a wheel, in which a clutch mechanism is arranged on a route from the prime mover to the wheel, and in which a shift range or shift position can be shifted selectively between a drive range or drive position where a power can be transmitted through the route from the prime mover to the wheel and a non-drive range or non-drive position where a power cannot be transmitted through the route from the prime mover to the wheel, characterized by comprising: a vehicle speed control demand judging means for judging a vehicle speed control demand in case of shifting the shift range or shift position from the non-drive range or non-drive position to the drive range or drive position; and a prime mover control means for controlling a torque of the prime mover on the basis of a judgment of the vehicle speed control demand judging means.

Here, according to the invention, a second prime mover is connected to an input side of the continuously variable transmission.

In addition to above, the continuously variable transmission comprises an input element, a reaction element and an output element capable of rotating differentially among each other. The input element is connected with the second prime mover, the reaction element is connected with a reaction force establishing device, and the output element is connected with the prime mover in a power transmittable manner. Therefore, a speed change ratio of the continuously variable transmission can be controlled steplessly by controlling an output of the reaction force establishing device. Also, there is provided a transmission in which a gear stage thereof is controlled by controlling a torque capacity of the clutch mechanism.

The vehicle speed control demand judging means includes a means for judging a braking demand, and the prime mover control means includes a means for raising a torque of the prime mover and a means for changing a timing of raising the torque of the prime mover depending on an existence of the braking demand.

More specifically, the prime mover control means includes a means for accelerating the timing of raising the torque of the prime mover in case the braking demand is not being outputted, in comparison with the case in which the braking demand is being outputted.

In addition to above, the vehicle speed control demand judging means includes a means for judging an acceleration demand on the basis of an opening degree of an accelerator. Also, the control system of the invention further comprises: a revolution frequency control means for controlling a revolution frequency of the prime mover in accordance with the opening degree of the accelerator in case the opening degree of the accelerator is increased prior to shifting the shift range or shift position from the non-drive range or non-drive position to the drive range or drive position; a first torque control means for controlling the torque of the prime mover for the drive range or drive position in accordance with the opening degree of the accelerator, in case the shift range or shift position is shifted from the non-drive range or non-drive position to the drive range or drive position; and a torque capacity control means for controlling a torque capacity of the clutch mechanism for the drive range or drive position in accordance with the opening degree of the accelerator, in case the shift range or shift position is shifted from the non-drive range or non-drive position to the drive range or drive position.

The control system of the invention further comprises a prime mover starting means for starting the second prime mover in case the opening degree of the accelerator is increased prior to shifting the shift range or shift position from the non-drive range or non-drive position to the drive range or drive position, and controlling the revolution frequency of the prime mover.

The revolution frequency control means includes a means for controlling a revolution frequency of the prime mover in accordance with the opening degree of the accelerator.

More specifically, the revolution frequency control means includes a means for controlling a revolution frequency of the second prime mover in accordance with the opening degree of the accelerator.

The prime mover starting means includes a means for keeping the revolution frequency of the second prime mover in accordance with the revolution frequencies of the prime mover and the second prime mover, lower than an upper limit guard value for preventing a rise in the revolution frequency of the prime mover.

More specifically, the prime mover starting means includes a means for controlling the revolution frequency of the second prime mover by controlling an output of the second prime mover, and the control system of the invention further comprises: a second torque control means for controlling a torque of the reaction force establishing device to a minimum value during a period from a commencement to a termination of a shifting operation from the non-drive range or non-drive position to the drive range or drive position.

In addition to above, the vehicle speed control demand judging means further includes a means for judging the vehicle speed control demand in accordance with the opening degree of the accelerator or the breaking demand.

Also, the prime mover control means includes a means for raising the torque of the prime mover gradually.

Furthermore, the vehicle speed control demand judging means includes a means for judging the vehicle speed control demand wherein the timing of the judgment is at least one of: before a shifting operation of the shift range or shift position from the non-drive range or non-drive position to the drive range or drive position; during the shifting operation; and after a completion of the shifting operation.

In addition to above, according to the invention, a transmission is arranged on a power transmission route from the prime mover to the wheel, the continuously variable transmission is an electrical continuously variable transmission in which a speed change ratio thereof is controlled electrically and steplessly, and the transmission is a geared transmission in which a gear stage thereof is changed stepwise. Those electrical continuously variable transmission and geared transmission may be connected in tandem so as to input power outputted from any one of those transmissions to the other one. Also, a total speed change ratio of the drive unit may be set by both of the electrical continuously variable transmission and geared transmission.

The electrical continuously variable transmission includes a single pinion type planetary gear mechanism comprising a carrier functioning as an input element, a sun gear functioning as a reaction element, and a ring gear functioning an output element.

On the other hand, the transmission is constructed of two sets of planetary gear mechanisms and a plurality of engagement devices, and the aforementioned clutch mechanism includes a plurality of engagement devices.

In addition to above, according to the invention, the two sets of planetary gear mechanisms include a single pinion type planetary gear mechanism. The sun gears of the first and the second planetary gear mechanisms are connected with each other, and the carrier of the first planetary gear mechanism and the ring gear of the second planetary gear mechanism are connected with each other. Also, the engagement device comprises: a first clutch connecting the ring gear of the first planetary gear mechanism with the output element of the power distribution mechanism selectively; a second clutch connecting the sun gear of the first planetary gear mechanism and the sun gear of the second planetary gear mechanism with the output element of the power distribution mechanism selectively; a first brake fixing the sun gears of the first and the second planetary gear mechanisms selectively; and a second brake fixing the carrier of the second planetary gear mechanisms selectively.

According to the invention, therefore, a driving force is generated by transmitting the torque of the prime mover to the wheel through the clutch mechanism. As mentioned above, the vehicle speed control demand is judged when shifting from the non-drive range or non-drive position to the drive range or drive position, and the torque of the prime mover is controlled on the basis of the judgment of the vehicle speed control demand. For this reason, deterioration in the response of transmission of the driving force resulting from the shifting of the shift range or shift position can be prevented.

In addition to the above advantage, according to the invention, the torque of the second prime mover is transmitted to the continuously variable transmission.

Also, a driving force is generated by transmitting the torque of the second prime mover to the wheel through the continuously variable transmission and the clutch mechanism. According to the invention, the speed change ratio of the continuously variable transmission can be controlled steplessly by controlling the output of the reaction force establishing device.

In addition to the above advantages, according to the invention, the timing to raise the torque of the prime mover can be changed depending on an existence of the braking demand. Therefore, the control response of the driving force can be further improved.

In addition to the above advantages, according to the invention, the timing to raise the torque of the prime mover can be accelerated in case the braking demand is not being outputted, in comparison with the timing of case in which the braking demand is being outputted. Therefore, the control response of the driving force can be further improved.

In addition to the above advantages, according to the invention, the revolution frequency of the prime mover can be controlled in accordance with the opening degree of the accelerator in case the opening degree of the accelerator is increased prior to shifting the shift range or shift position from the non-drive range or non-drive position to the drive range or drive position, and the torque of the prime mover can be controlled in accordance with the opening degree of the accelerator for the drive range or drive position in case the shift range or shift position is shifted from the non-drive range or non-drive position to the drive range or drive position. Also, in case the shift range or shift position is shifted from the non-drive range or non-drive position to the drive range or drive position, the torque capacity of the clutch mechanism can be controlled for the drive range or drive position in accordance with the opening degree of the accelerator. Therefore, the control response of transmitting the driving force to the wheel can be further improved.

In addition to the above advantages, according to the invention, the second prime mover can be started in case the opening degree of the accelerator is increased prior to shifting from the non-drive range or non-drive position to the drive range or drive position while controlling the revolution frequency of the prime mover. Therefore, it is possible to discriminate the aforementioned case from the case in which the opening degree of the accelerator is not increased.

In addition to the above advantages, according to the invention, the revolution frequency of the prime mover can be controlled in accordance with the opening degree of the accelerator. Therefore, a running characteristic of the vehicle can be set arbitrarily in accordance with the opening degree of the accelerator.

In addition to the above advantages, according to the invention, the revolution frequency of the second prime mover can be controlled in accordance with the opening degree of the accelerator.

In addition to the above advantages, according to the invention, the revolution frequency of the second prime mover can be kept lower than the upper limit guard value for preventing a rise in the revolution frequency of the prime mover, in accordance with the revolution frequencies of the prime mover and the second prime mover. Therefore, the revolution frequency of the reaction force establishing device can be suppressed lower than the structural limitation of the revolution frequency.

In addition to the above advantages, according to the invention, the revolution frequency of the second prime mover can be controlled by controlling the output thereof, and torque of the reaction force establishing device can be controlled to the minimum value during a period from a commencement to a termination of a shifting operation from the non-drive range or non-drive position to the drive range or drive position. Therefore, the revolution frequency of the second prime mover can be controlled only by controlling the revolution frequency of the prime mover. For this reason, interference between the control of revolution frequency of the reaction force establishing device and the control of revolution frequency of the second prime mover can be avoided.

In addition to the above advantages, according to the invention, the vehicle speed control demand can be judged on the basis of an opening degree of the accelerator or a braking demand. Therefore, a judging accuracy of the vehicle speed control demand can be improved.

In addition to the above advantages, according to the invention, the torque of the prime mover can be raised gradually.

In addition to the above advantages, according to the invention, the vehicle speed control demand can be judged in at least one of: before a shifting operation from the non-drive range or non-drive position to the drive range or drive position, during the shifting operation, and after a completion of the shifting operation.

BEST MODE FOR CARRYING OUT THE INVENTION

Figure 2:
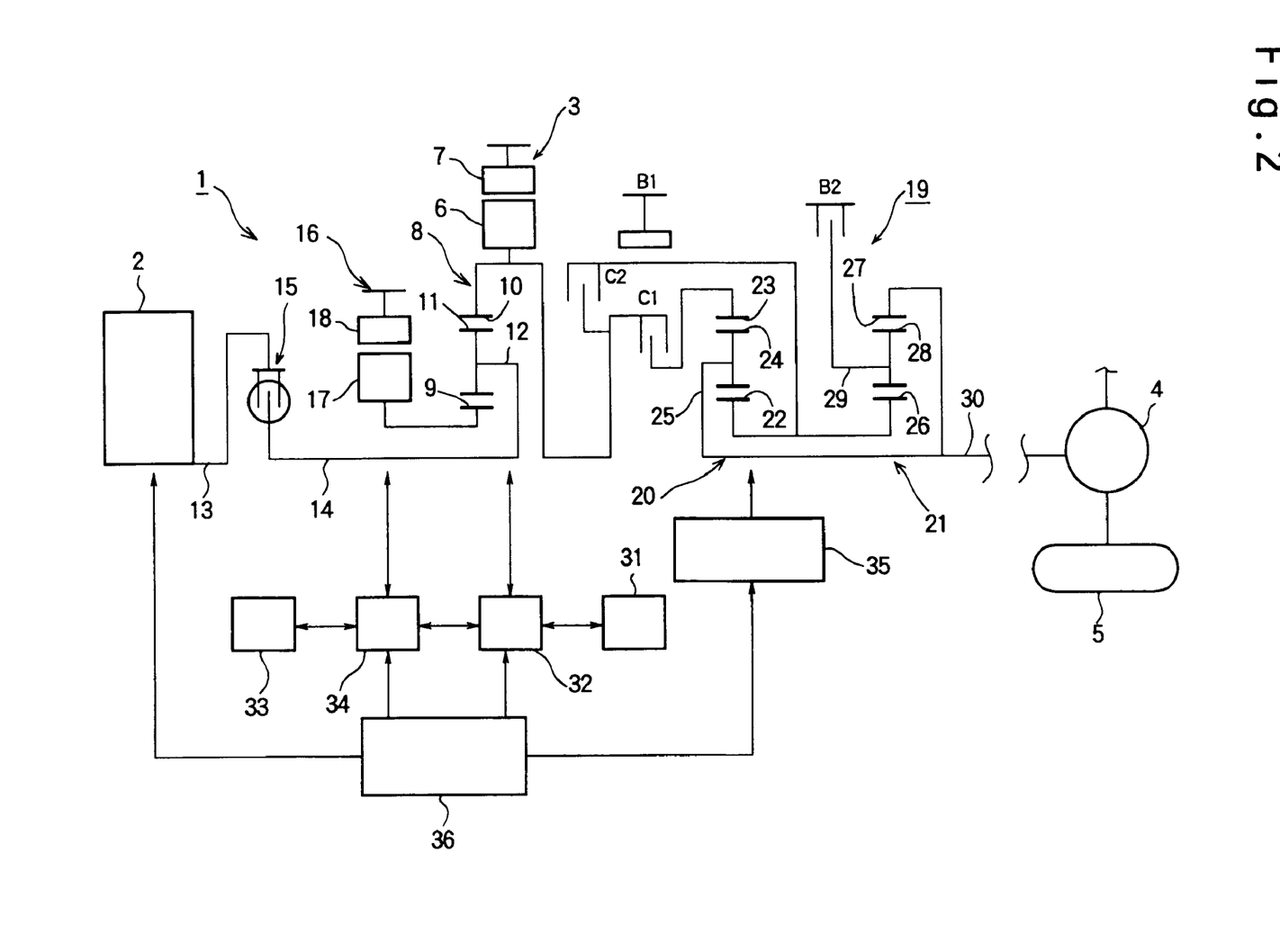
FIG. 2 is a schematic diagram showing a power train of a vehicle and a control line thereof to which the invention is applied.

Next, the present invention will be explained more specifically with reference to the accompanying drawings. FIG. 2 is a skeleton diagram showing one example of a power train of a hybrid vehicle to which the invention is applied. There are provided an engine 2 and a motor generator 3 (MG2) functioning as prime movers of a vehicle 1. The engine 2 and the motor generator 3 (MG2) are connected with a wheel 5 through a differential mechanism 4. The engine 2 is a power unit converting a thermal energy into a kinetic energy by burning a fuel. For example, an internal combustion engine such as a gasoline engine, a diesel engine, an LPG engine and so on can be used as the engine 2. The motor generator 3 comprises a rotor 6 and a stator 7. The motor generator 3 converts electric energy into mechanical energy, and converts mechanical energy into electrical energy. That is, the motor generator 3 functions as a motor (i.e., power generating function) and also functions as a generator (i.e., regenerating function).

A power distribution mechanism 8 is arranged on a route from the engine 2 to the differential mechanism 4. The power distribution mechanism 8 is composed mainly of a single pinion type planetary gear mechanism. Specifically, the power distribution mechanism 8 comprises: a sun gear 9 and a ring gear 10 arranged coaxially; and a carrier 12, which holds a pinion gear 11 meshing with the sun gear 9 and the ring gear 10 in a rotatable and revolvable manner. A crankshaft 13 of the engine 2 and an input shaft 14 are arranged coaxially, and those shafts are connected in a power transmittable manner through a damper mechanism 15. Also, the carrier 12 is connected with the input shaft 14 to rotate integrally therewith. As explained later, a speed change ratio of the power distribution mechanism 8 can be controlled electrically and steplessly. Also, an another motor generator 16 (MG1) is provided between the engine 2 and the power distribution mechanism 8 in an anteroposterior direction of the vehicle 1. The motor generator 16 also comprises a rotor 17 and a stator 18. The motor generator 16 also converts electric energy into mechanical energy, and converts mechanical energy into electrical energy. That is, the motor generator 16 also functions as a motor (i.e., power generating function) as well as a generator (i.e., regenerating function). The rotor 17 of the motor generator 16 is connected with the sun gear 9 in a power transmittable manner. In other words, the rotor 17 and the sun gear 9 are connected to rotate integrally. Also, the rotor 6 of the motor generator 3 is connected with the ring gear 10 in a power transmittable manner. In other words, the rotor 6 and the ring gear 10 are connected to rotate integrally. Thus, the vehicle 1 comprises two kinds of prime movers having different principles of power generation, such as the engine 2, and the motor generators 3 and 16.

A transmission 19 is arranged on a route from the ring gear 10 of the power distribution mechanism 8 to the differential 4. The transmission 19 is a geared transmission capable of controlling a ratio between an input revolution and an output revolution, i.e., a gear stage thereof stepwise (i.e., discontinuously). The transmission 19 comprises two sets of planetary gear mechanisms, specifically, a first planetary gear transmission mechanism 20 and a second planetary gear transmission mechanism 21. The first planetary gear transmission mechanism 20 is a single pinion type planetary gear mechanism comprising: a sun gear 22 and a ring gear 23 arranged coaxially; and a carrier 25, which holds a pinion gear 24 meshing with the sun gear 22 and the ring gear 23 in a rotatable and revolvable manner. On the other hand, the second planetary gear mechanism 21 is also a single pinion type planetary gear mechanism comprising: a sun gear 26 and a ring gear 27 arranged coaxially; and a carrier 29, which holds a pinion gear 28 meshing with the sun gear 26 and the ring gear 27 in a rotatable and revolvable manner.

The sun gears 22 and 26 are connected to rotate integrally, and the carrier 25 is connected with the ring gear 27 to rotate integrally. The carrier 25 and the ring gear 27 are connected with an output shaft 30 of the transmission 19. The transmission 19 further comprises engagement devices for connecting and disconnecting the rotary elements such as the gears and the carriers. Specifically, there are provided a clutch C1 connecting and releasing the ring gears 10 and 23, and a clutch C2 connecting the ring gear 10 with the sun gears 22 and 26, and releasing the ring gear 10 from the sun gears 22 and 26. Also, there are provided a brake B1 for controlling a rotation and a cessation of the sun gears 22 and 26, and a brake B2 for controlling a rotation and a cessation of the carrier 29. Any of a frictional engagement device, an electromagnetic engagement device, and a meshing type engagement device may be used as the engagement device, however, the frictional engagement device is used in the example to be explained hereinafter.

Figure 3:
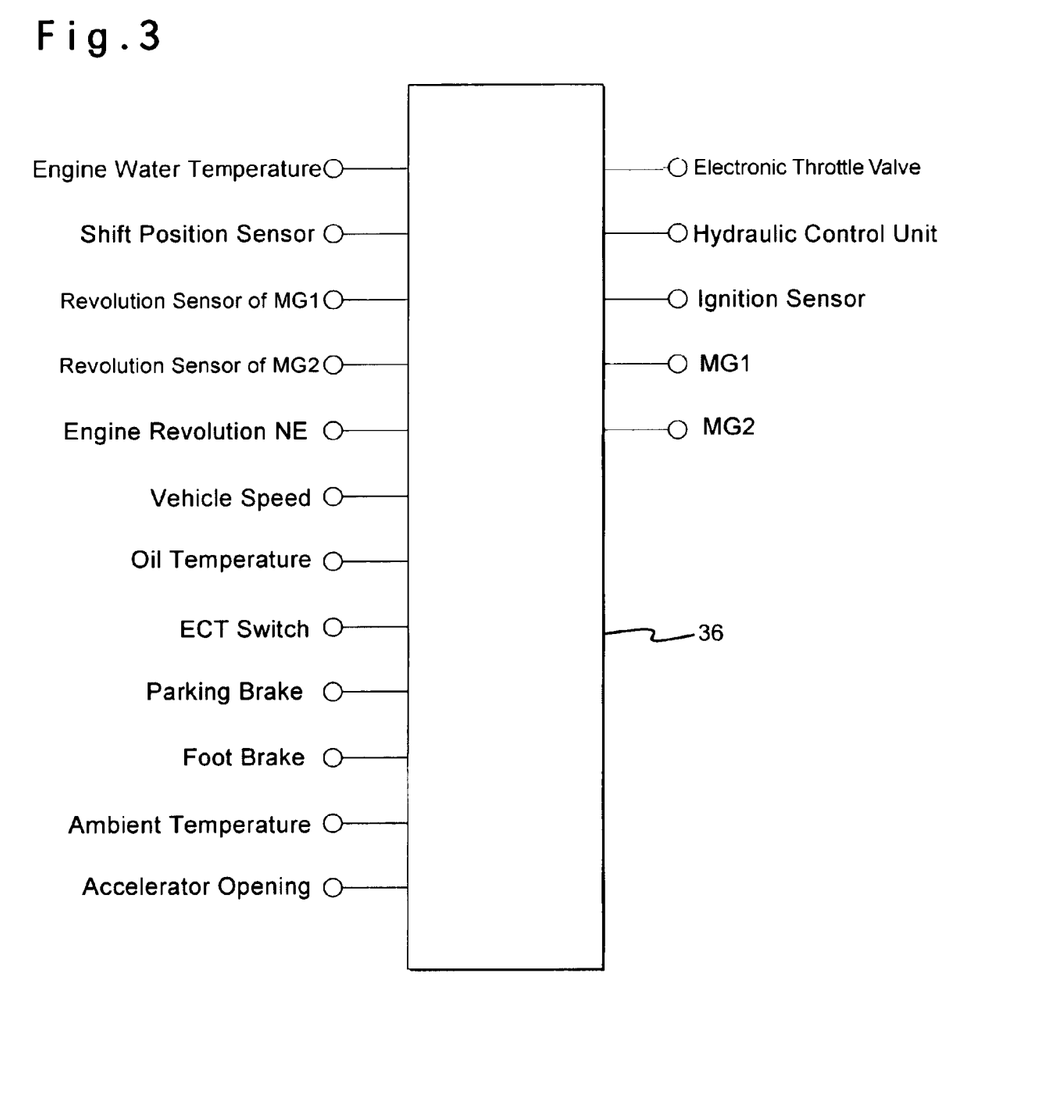
FIG. 3 is a schematic diagram showing signals inputted to an electronic control unit of the vehicle shown in FIG. 2, and signals outputted therefrom.

Next, a control line of the vehicle 1 will be explained hereinafter. There are provided an electric storage device 31 exchanging electric power with the motor generator 3, and an inverter 32 for controlling the motor generator 3. Also, there are provided an electric storage device 33 exchanging electric power with the motor generator 16, and an inverter 34 for controlling the motor generator 16. A secondary battery, more specifically, a battery, a capacitor and so on can be used as the electric storage devices 31 and 33. Further, there is provided a hydraulic control unit 35 functioning as an actuator to control torque capacities of the clutches C1 and C2 and the brakes B1 and B2 of the transmission 19, in other words, to control engagement and disengagement of those clutches and brakes. The hydraulic control unit 35 is a known unit comprising a hydraulic circuit, a solenoid valve and so on. Also, there is provided an electronic control unit 36 for controlling the engine 2, the invertors 32 and 34, and the hydraulic control unit 35. As shown in FIG. 3, a signal from a shift range sensor (in FIG. 3, expressed as "shift position sensor" for the sake of convenience), a signal from an engine water temperature sensor, signals from a revolution sensors of the motor generators 3 and 16, a signal from an engine revolution sensor, a signal from a vehicle speed sensor, a signal from an ambient temperature sensor, a signal from an oil temperature sensor, a signal from an ECT switch, a signal from a parking brake switch, a signal from a foot brake switch, a signal from an accelerator opening sensor and so on are inputted to the electronic control unit 36.

Here, the signal from the shift range sensor is a manipulate signal of a shifting device which selectively connects and disconnects a power transmission route from the engine 2 and the motor generator 3 to the wheel 5, more specifically, a power transmission route of the transmission 19. The shifting device is operated manually by a driver of the vehicle, and any type of shifting device, e.g., a lever type, button type, and touch switch type of shifting devices may be used. Also, the brake switch is a switch for detecting a braking demand for the vehicle. Specifically, an operating amount, an operating speed and so on of a braking demand generating device (i.e., a brake pedal, a lever, etc.) are detected. On the other hand, the accelerator opening sensor is a sensor for detecting an acceleration and deceleration demands for the vehicle. Specifically, an operating amount, an operating speed and so on of an acceleration demand generating device (i.e., an accelerator pedal, a lever, etc.) are detected. Additionally, those braking demand generating device and acceleration demand generating device are devices independent from the shifting device. On the other hand, a signal for controlling an electronic throttle valve of the engine 2, a signal for controlling a fuel injection device of the engine 2, a signal for controlling an ignition device of the engine 2, signals for controlling the motor generators 3 and 16 through the invertors 32 and 34, a signal for controlling the hydraulic control unit 35 and so on are outputted from the electronic control unit 36.

Next, here will be explained a control of the vehicle 1. The engine torque is transmitted to the carrier 12 of the power distribution mechanism 8 through the input shaft 14 by driving the engine 2, and the engine torque is outputted from the ring gear 10 of the power distribution mechanism 8 by establishing a reaction force against the engine torque by the motor generator 16. A speed change ratio of the power distribution mechanism 8 can be controlled steplessly (i.e., continuously) by controlling a rotational direction (i.e., forward and backward) of the motor generator 16, and by controlling an operating state thereof between a motor and a generator. Specifically, the carrier 12 functions as an input element, the sun gear 9 functions as a reaction element, and the ring gear 10 functions as an output element. In this situation, the power distribution mechanism 8 functions as a continuously variable transmission as a result of a differential action performed by the carrier 12, the sun gear 9 and the ring gear 10. For example, the speed change ratio of the power distribution mechanism 8 can be controlled by the following method. First of all, a drive demand is obtained on the basis of an opening degree of an accelerator and a vehicle speed, and a target engine output is obtained on the basis of the drive demand. In order to achieve the target engine output, an operating condition of the engine 2 is determined in line with an optimum fuel economy curve, and a target engine revolution and a target engine torque are obtained. Then, the speed change ratio of the power distribution mechanism 8, more specifically, an input revolution is controlled to approximate an actual engine revolution to the target engine revolution. Also, an opening degree of an electronic throttle valve or the like is controlled to approximate the actual engine torque to the target engine torque.

Figure 4:
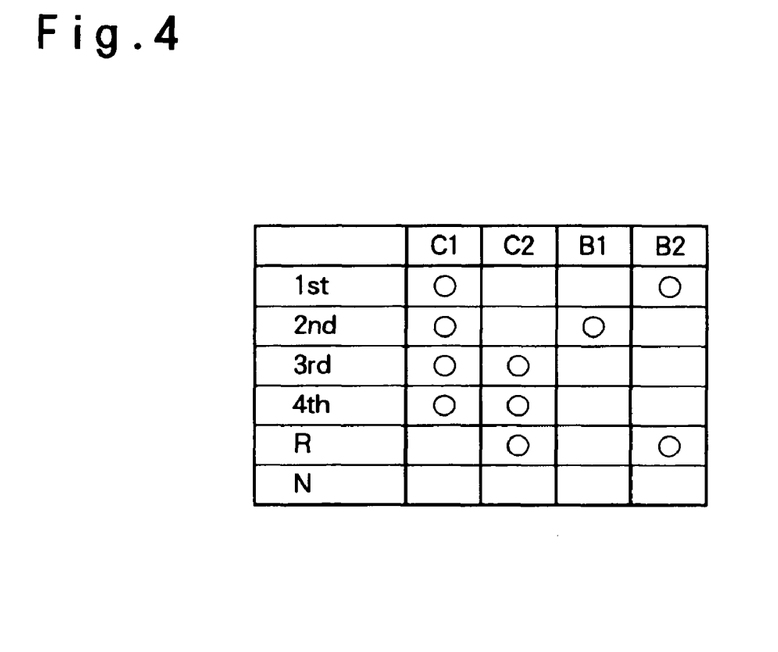
FIG. 4 is a table showing operating states of the clutch mechanisms in each gear stage of D range and R range of the transmission shown in FIG. 2.

A shift range for controlling the transmission 19 can be selected from e.g., P (i.e., parking) range, R (i.e., reverse) range, N (i.e., neutral) range and D (i.e., drive) range. For example, in case D range is selected in the transmission 19 shown in FIG. 2, the gear stage of the transmission 19 can be shifted selectively within a first (1st) stage, a second (2nd) stage, a third (3rd) stage and a fourth (4th) stage. In order to shift the gear stage selectively, a speed change map for determining the gear stage according to a vehicle speed and an opening degree of the accelerator is stored in the electronic control unit 36. Control states of the engagement devices under each gear stage of D range, and also N and R ranges are indicated in FIG. 4. In FIG. 4, "◯" in a column represents an engagement of the corresponding engagement device, and a blank column represents a state where the corresponding engagement device is released. Specifically, in case of setting the first stage, the clutch C1 and the brake B2 are engaged, and the clutch C2 and the brake B1 are released. In case of setting the second stage, the clutch C1 and the brake B1 are engaged, and the clutch C2 and the brake B2 are released. In case of setting the third or fourth stage, both of the clutches C1 and C2 are engaged, and both of the brakes B1 and B2 are released. Here, in case of setting the third or fourth stage, the control contents for the transmission 19 are identical in both cases, however, different controls are carried out for the power distribution mechanism 8 in each case. Details of such differences will be explained later. In case of setting R range, the clutch C2 and the brake B2 are engaged, and the clutch C1 and the brake B1 are released. In case N or P range is selected, all of the engagement devices are released.

Figure 5:
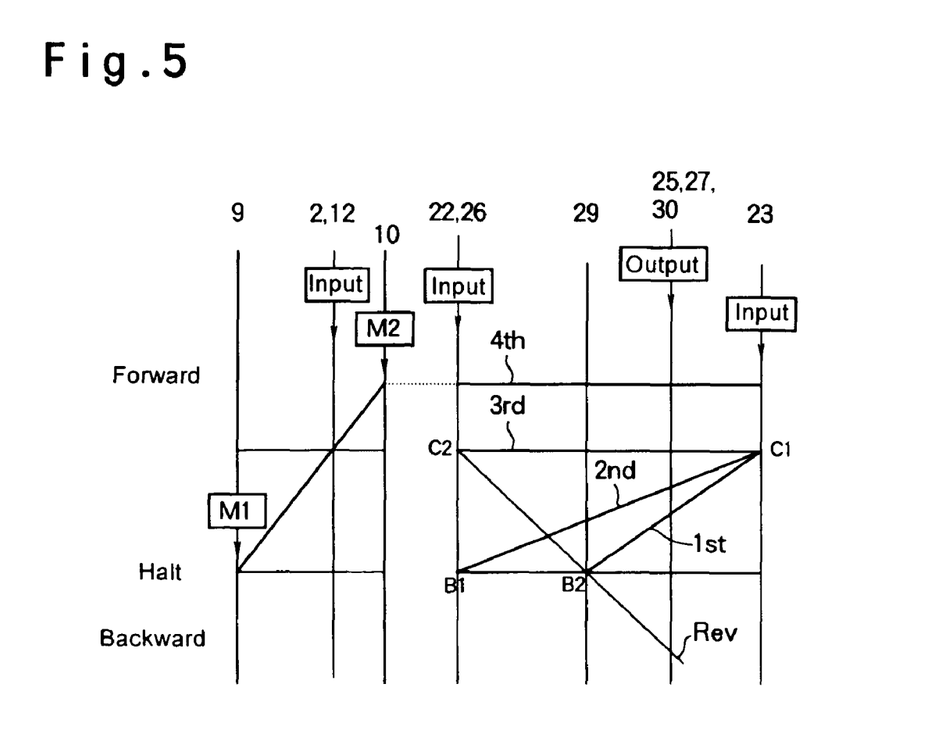
FIG. 5 is a nomographic diagram showing shift ranges set by the power distribution mechanism and the transmission shown in FIG. 2.

Next, statuses of the rotary elements of the transmission 19 under D range will be explained with reference to the nomographic diagram of FIG. 5. In the part of FIG. 5 representing the power distribution mechanism 8, an ordinate axis of the carrier 12 (i.e., an engine 2) is situated between axes of the motor generators 3 and 16. In FIG. 5, "Forward" means a forward rotation, and "Backward" means a backward direction. Here, the "forward direction" means a rotational direction of the engine 2. In case the first stage is selected, the clutch C1 is engaged, and at least one of the torques of the engine 2 and the motor generator 3 is inputted to the ring gear 28 of the transmission 19. In this case, the carrier 29 halted by engaging the brake B2 functions as a reaction element, and the torques outputted from the carrier 25 and the ring gear 27 are transmitted to the output shaft 30. Consequently, the wheel 5 is driven by the torque of the output shaft 30 transmitted to through the differential 4. In case the first stage is thus selected, revolution frequencies of the ring gear 27 and the carrier 25 are lower than that of the ring gear 23. That is, a speed change ratio of the transmission 19 is larger than "1".

In case the second stage is selected, the clutch C1 and the brake B1 are engaged. Therefore, at least one of the torques of the engine 2 and the motor generator 3 is inputted to the ring gear 28 of the transmission 19. In this case, the halted sun gear 22 functions as a reaction element, and the torque outputted from the carrier 25 is transmitted to the output shaft 30. In case the second stage is thus selected, a revolution frequency of the carrier 25 is lower than that of the ring gear 23. That is, a speed change ratio of the transmission 19 is larger than "1". Here, provided that the input revolution is constant, the revolution frequency of the carrier 25 under the first gear stage is lower than that under the second stage. This means that the speed change ratio of the case in which the first stage is set is larger than that of the case in which the second stage is set.

In case the third or fourth stage is selected, both of the clutches C1 and C2 are engaged, therefore, all of the rotary members constituting the first and the second planetary gear transmission mechanisms 20 and 21 are rotated integrally. That is, in case the third or fourth stage is set, the speed change ratio of the transmission 19 is "1". In other wards, the input rotary element and the output rotary element of the transmission 19 are connected directly. Here, a difference between the third stage and the fourth stage is that the motor generator 16 of the power distribution mechanism 8 will not be halted in case of setting the third stage, but it will be halted, i.e., the revolution frequency thereof is zero in case of setting the fourth stage. In case R range is selected, the clutch C2 is engaged, therefore, the sun gear 26 functions as an input element and the carrier 29 functions as a reaction element. Consequently, the ring gear 27 is rotated backwardly. Here, the nomographic diagram of FIG. 5 shows a case in which the revolution frequency of the engine 2 is constant. In case D range or R range is thus selected, the torques of the engine 2 and the motor generator 3 can be transmitted to the wheel 5. That is, D range and R range are categorized into the "drive range or drive position" in the present invention. To the contrary, all of the engagement devices are released in case N range or P range is selected. Specifically, both of the clutches C1 and C2 are released to disable the transmission of the torques of the engine 2 and the motor generator 3 to the wheel 5. That is, N range and P range are categorized into the "non-drive range or non-drive position" in the present invention.

Here will be explained a control method to be carried out in the vehicle 1 thus structured with reference to a flowchart in FIG. 1. First of all, it is judged whether or not a garage shift is started while the vehicle 1 is stopping (at Step S1). Here, the definition of the "garage shift" is a shifting operation of the shift range or shift position including an operation of shifting the shift range or shift position from the non-drive range or non-drive position to the drive range or drive position. In case the answer of Step S1 is YES, a vehicle speed control demand is judged (at Step S2). Specifically, it is judged whether or not a braking demand (or a deceleration demand) is outputted, or whether or not the braking demand is increased. For example, in case the brake pedal is not stepped on and the brake switch is OFF, the answer of Step S2 will be YES so that the routine advances to Step S3. That is, in the flowchart of FIG. 1, the vehicle speed control demand, i.e., the braking demand is judged based on the signal of the brake switch. This means that if the answer of Step S2 is YES, there is no braking demand. Therefore, at Step S3, a predetermined additional value $\alpha$ is added to a normal oil pressure of a hydraulic chamber of the engagement device to be engaged at the selected gear stage of the drive range or drive position. The oil pressure of the engagement device at the normal time, and the additional value $\alpha$ will be explained later.

Subsequent to step S3, it is judged whether or not a predetermined time TNDFST has elapsed since the starting time of the garage shift (at Step S4). Here, the predetermined time TNDFST is the time required for estimating that the torque capacity of the engagement device reaches a value possible to transmit the torque, since the point of time when the garage shift is started and the oil pressure of the engagement device start rising. The predetermined time TNDFST is stored in the electronic control unit 36 in advance. In case the answer of Step S4 is YES, a control to further increase the oil pressure of the hydraulic chamber of the engagement device, and a control to increase the torque of the motor generator 3 gradually are carried out (at Step S5). Then, the control routine is ended. A creep force is established by the rise in the torque of the motor generator 3.

To the contrary, in case the answer of Step S2 is NO, this means that the braking demand is being outputted. Therefore, the oil pressure of the hydraulic chamber of the engagement device to be engaged under the selected gear stage of the drive range or drive position is controlled to the oil pressure for the normal time (at Step S6). Subsequent to Step S6, it is judged whether or not a predetermined time TNDNRM has elapsed since the starting time of the garage shift (at Step S7). Here, the predetermined time TNDNRM is the time required for estimating that the torque capacity of the engagement device reaches a value possible to transmit the torque, since the point of time when the garage shift is started and the oil pressure of the engagement device start rising. The relation between the predetermined times TNDFST and TNDNRM will be explained later. In case the answer of Step S7 is YES, the routine advances to Step S5. To the contrary, in case the answer of Step S7 is NO, the control routine is ended. The control routine is also ended in case the answer of Steps S1 or S4 is NO.

Figure 6:
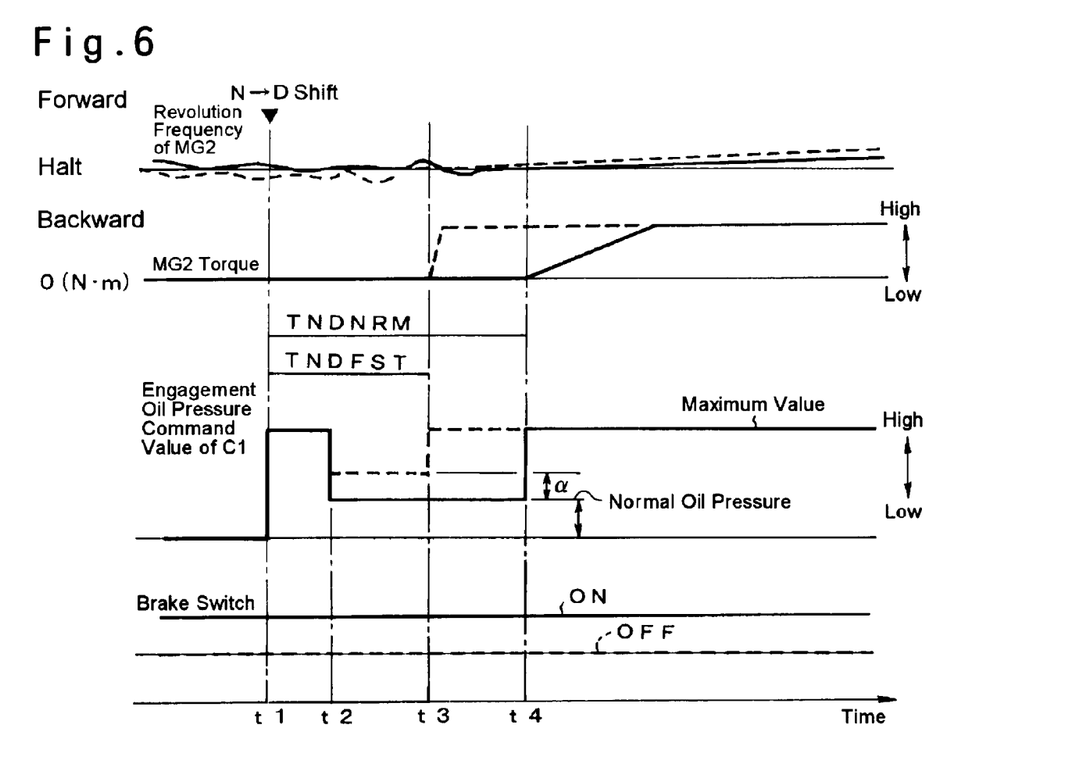
FIG. 6 is a time chart corresponding to the control method shown in FIG. 1.

Here will be explained one example of a time chart corresponding to the flowchart in FIG. 1 with reference to FIG. 6. The time chart of FIG. 6 shows a case in which the shift range is shifted from N range to D range, especially, a case in which the first stage of D range is selected and the clutch C1 is engaged. Before the time t1, N range is selected and the oil pressure of the clutch C1 is controlled to a low pressure. Also, the torque of the motor generator 2 is controlled to zero (N·m), that is, the motor generator 2 is halted. In case the shift range is shifted from N range to D range at the time t1, and the brake switch is turned ON as indicated by a solid line, the oil pressure of the clutch C1 is raised abruptly, and lowered to the normal pressure at the time t2. After the time t2, the oil pressure acts on the clutch C1 is kept to the normal pressure indicated by the solid line, and then, the oil pressure of the clutch C1 is raised to the maximum value at the time t4, i.e., when the predetermined time TNDNRM has elapsed since the time t1. After the time t4, the oil pressure of the clutch C1 is kept to the maximum value. On the other hand, a control to increase the torque of the motor generator 3 gradually is started from the time t4, and then, the torque of the motor generator 3 is kept to the normal torque. Here, the predetermined time TNDNRM is stored in the electronic control unit 36 in advance.

Next, here will be explained a case in which the brake switch is turned OFF at the time t1. The oil pressure of the clutch C1 is raised abruptly as explained above also in this case. Then, the oil pressure applied to the clutch C1 is lowered at the time t2. As indicated by a broken line, in case the brake switch is turned OFF, the additional value α is added to the normal pressure so that the oil pressure of this case is higher than the normal pressure. Then, at the time t3, i.e., when the predetermined time TNDFST has elapsed since the time t1, the oil pressure acts on the clutch C1 is raised to the maximum value, and a control to raise the output torque of the motor generator 3 as indicated by the broken line is carried out. Here, the predetermined time TNDFST is shorter than the predetermined time TNDNRM. The rising gradient of the torque of the motor generator 3 is steeper in case the brake switch is turned OFF, in comparison with that of the case in which the brake switch is turned ON. Then, the torque of the motor generator 3 of the case in which the brake switch is turned OFF is controlled to the normal torque. Here, in the time chart of FIG. 6, the revolution frequency of the motor generator 3 of the case in which the brake switch is turned ON is indicated by the solid line. On the other hand, the revolution frequency of the motor generator 3 of the case in which the brake switch is turned OFF is indicated by the broken line.

Figure 1:
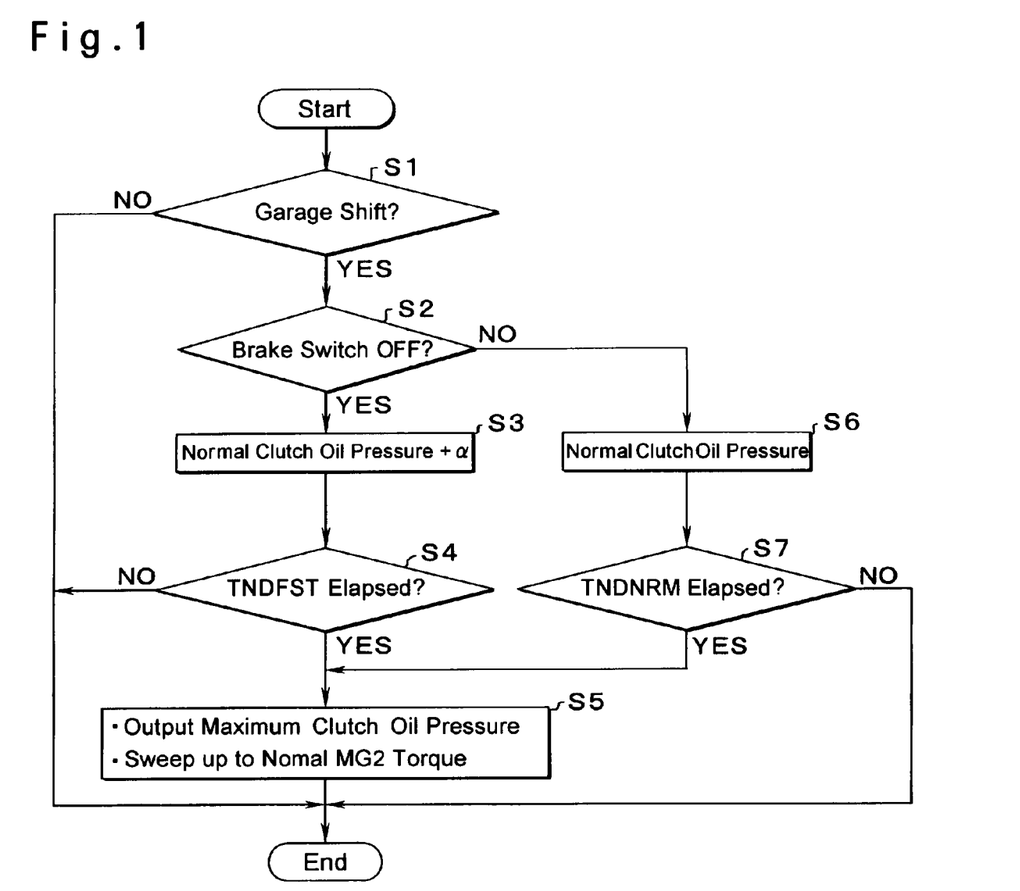
FIG. 1 is a flowchart showing the control method carried out by the control system for drive unit of vehicle of the invention.

Thus, according to the control method in FIG. 1, the output torque of the motor generator 3 is controlled in different manners depending on an existence of the braking demand, in case the shift range or shift position is shifted from the non-drive range or non-drive position to the drive range or drive position. Specifically, the timing of raising the output torque of the motor generator 3 is earlier in case the braking demand is not outputted, in comparison with the case in which the braking demand is outputted. Therefore, the control response of the torque transmitted to the wheel 5 is improved in case the braking demand is not outputted. Consequently, the drivability is improved. That is, in case the braking demand is not outputted, the shocks resulting from the rise in the torque are within an allowable range. On the other hand, in case the brake switch is turned ON, the timing to raise the torque of the motor generator 3 is delayed so that the rising gradient of the torque is gentle. Therefore, the shocks resulting from the rise in the torque transmitted to the wheel 5 are minimized.

Here will be explained a corresponding relation between the example illustrated in FIG. 2 and the invention. The engine 2 corresponds to the second prime mover of the invention; the wheel 5 corresponds to the wheel of the invention; the power distribution mechanism 8 corresponds to the continuously variable transmission and the electrical continuously variable transmission of the invention; the transmission 19 corresponds to the transmission of the invention; the carrier 12 corresponds to the input element of the invention; the sun gear 9 corresponds to the reaction element of the invention; the ring gear 10 corresponds to the output element of the invention; the motor generator 16 corresponds to the electric motor and the reaction force establishing device of the invention; the motor generator 3 corresponds to the prime mover and the electric motor of the invention; the clutches C1 and C2, and the brakes B1 and B2 correspond to the clutch mechanisms and the engagement devices of the invention; the clutch C1 corresponds to the first clutch of the invention; the clutch C2 corresponds to the second clutch of the invention; the brake B1 corresponds to the first brake of the invention; and the brake B2 corresponds to the second brake of the invention. Corresponding relations between FIGS. 1 and 2, and the invention will also be explained hereinafter. The electronic control unit 36 for carrying out the controls of Steps S1 and S2 in FIG. 1 corresponds to the vehicle speed control demand judging means of the invention; and the electronic control unit 36 for carrying out the controls of Steps S4, S5 and S7 in FIG. 1 corresponds to the prime mover control means of the invention.

Additionally, at step S1 in FIG. 1, not only the shifting from N range to D range, but also a shifting from P range to D range, and a shifting from P range to R range can be judged. Moreover, it is also possible to control the oil pressure of the clutch C2 at Steps S3 and S6 instead of the clutch C1. Further, the control example of FIG. 1 can also be applied to a case in which the first stage is inhibited when shifting to D range so that the second stage is to be selected. Furthermore, at Step S2 in FIG. 1, it is also possible to judge that the brake switch is OFF in case a stepping amount of the accelerator pedal is large or a stepping speed of the accelerator pedal is fast, and to judge that the brake switch is ON in case a stepping amount of the accelerator pedal is small or a stepping speed of the accelerator pedal is slow.

Here will be explained another control method to be carried out in the vehicle 1 shown in FIG. 2 with reference to a flowchart in FIG. 7. First of all, it is judged whether or not an acceleration demand is being outputted under the non-drive range or non-drive position (at Step S11). For example, in case N range is selected and the accelerator pedal is not stepped on, the answer of Step S11 is NO so that the control routine is ended. Specifically, the engine 2 is halted and the motor generators 3 and 13 are kept to be halted. To the contrary, in case the accelerator pedal is stepped on at the moment of the judgment of Step S11, the answer of Step S 11 is YES. Thus, in the flowchart of FIG. 7, the vehicle speed control demand, specifically, an acceleration demand is judged on the basis of the opening degree of the accelerator. In case the answer of Step S11 is YES, it is judged whether or not the non-drive range or non-drive position is maintained (at Step S12). For example, in case the accelerator pedal is not stepped on, the answer of step S12 is YES. That is, a start of the vehicle 1 has not yet been demanded, therefore, a preparation control before starting the vehicle 1 is carried out (at Step S13).

At Step S13, both of the halted motor generators 3 and 16 are activated to rotate in the forward direction, that is, activated as motors to crank the engine 2, and a fuel injection control is carried out to rotate the engine 2 autonomously. After the engine 2 is started, a "revolution control" is carried out to control the motor generator 3 on the basis of a target revolution frequency. The target revolution frequency of the motor generator 3 and the revolution frequency of the engine 2 are controlled in accordance with the opening degree of the accelerator. For example, the target revolution frequencies of the motor generator 3 and the engine 2 selected at Step S13 are preset values set in accordance with a stepping amount of the accelerator. In addition, the torque of the motor generator 16 is controlled to zero Newton-meter at Step S13, however, both of the motor generator 3 and the engine 2 are rotated in the forward direction so that the motor generator 16 runs idle.

Subsequent to Step S13, it is judged whether or not the actual revolution frequency Ne of the engine 2 is higher than the guard value NEMAX (at Step S14). As mentioned above, both of the motor generator 3 and the engine 2 are rotated in the forward direction so that the motor generator 16 is idling at Step S13. Therefore, the guard value NEMAX is set as an upper limit of the revolution frequency of the engine 2 for preventing the idling motor generator 16 from rotating at the revolution frequency higher than the mechanical upper limit thereof. In case the answer of Step S14 is YES, the actual revolution frequency of the engine 2 is limited within the guard value NEMAX (at Step S15), and the control routine is ended. To the contrary, in case the answer of Step S14 is NO, the control routine is ended without carrying out any specific control.

On the other hand, in case the answer of Step S12 is NO, it is judged whether or not the shifting operation from the non-drive range or non-drive position to the drive range or drive position is being carried out (at Step S16). For example, if the shifting operation from N range to D range is being carried out, the answer of Step S16 will be YES. Then, a control to engage the engagement device for setting any of the gear stage in D range, by the normal oil pressure according to the opening degree of the accelerator (at Step S17). Here, the definition of "the normal oil pressure according to the opening degree of the accelerator" is same as that explained in the time chart of FIG. 6. Subsequent to Step S17, it is judged whether or not an inertia phase commences in the engagement device which is started to be engaged (at Step S18). Specifically, it is judged whether or not the torque capacity of the engagement device is raised to a value possible to transmit the torque. In case the answer of Step S18 is NO, the routine advances to Step S13. To the contrary, in case the answer of Step S18 is YES, the control of the motor generator 3 is shifted from the "revolution control" to the "torque control" (at Step S19), and the control routine is ended. Here, the "torque control" is a control to approximate the torque of the motor generator 3 to the target torque for the normal time. Specifically, at this step, the torque of the motor generator 3 is raised gradually, and the revolution frequency thereof is lowered. For example, the torque of the motor generator 3 is raised with a predetermined gradient smaller than 90 degrees in a map indicating a relation between a torque and a temporal change thereof. That is, the torque is not changed stepwise at 90 degrees. More specifically, the torque of the motor generator 3 is raised with a gradient which does not cause any shocks. Here, "the target torque of the motor generator 3 for the normal time" will be explained later.

In case the answer of Step S16 is NO, for example, in case the shifting operation from N range to D range (i.e., the garage shift) has already been terminated, the outputs of the motor generators 3 and 16 and the engine 2 are controlled under D range based on the vehicle speed, the opening degree of the accelerator and the optimum fuel economy curve (at Step S20). Then the control routine is ended.

Here will be explained one example of a time chart corresponding to the flowchart in FIG. 7 with reference to FIG. 8. The time chart of FIG. 8 shows a case of shifting the shift range or shift position from N range to D range, and setting the first stage. Before the time t1, the accelerator and the throttle are closed completely, both of the engine 2 and the motor generators 3 and 16 are halted, and an engagement command value of the clutch C1 is kept at the minimum value. After the time t1, the opening degrees of the accelerator and the throttle are increased, the motor generators 3 and 16 output positive torques (i.e., function as motors) so that the revolution frequencies thereof are raised, and the engine 2 is started so that the revolution frequency thereof is raised. Then, at the time t2, the torque of the motor generator 16 is controlled to zero Newton-meter. After the time t2, the motor generator 16 keeps generating the positive torque and the revolution frequency thereof is kept generally constant, and the revolution frequency of the engine 2 is also kept generally constant. Therefore, the motor generator 16 is idling at a generally constant speed.

When the shift range or shift position is shifted from N range to D range at the time t3, the command value to engage the clutch C1 is raised drastically, and lowered temporarily at the time t4. When the torque capacity of the clutch C1 is raised so that the inertia phase is commenced at the time t5, the torque of the motor generator 3 is raised and the revolution frequency thereof drops as explained in the explanation of Step S19. Here, since the revolution frequency of the engine 2 is constant, the revolution frequency of the idling motor generator 16 rises. Then, at the time t6, the torque of the motor generator 3 reaches the target torque for the normal time. Since then, the torque of the motor generator 3 is kept to the target torque for the normal time, and the revolution frequencies of the motor generators 3 and 16 are also kept substantially constant. Then, when the garage shift is terminated at the time t7, the engagement command value of the clutch C1 is raised to the maximum value. Also, as explained in the explanation of Step S20, the opening degree of the throttle is increased in accordance with the opening degree of the accelerator, and the motor generator 16 establishing the reaction torque against the engine torque generates a negative torque, in short, the motor generator 16 functions as a generator. Here, the aforementioned "judgment of termination of garage shift" can be made on the basis of the fact that D range is being selected for a predetermined time period.

In case of raising the torque of the motor generator 3 gradually, more specifically, in case of raising the torque of the motor generator 3 (i.e., MG2 torque) gradually between the times t5 and t6 in the time chart of FIG. 8, the rising gradient can be obtained by the following formula:

$$MG2 \text{ torque } i = (MG2 \text{ torque } i-1) + (\text{target revolution of } MG2 - \text{input revolution of the transmission } 19 - \text{actual revolution of } MG2) \times (MG2 \text{ torque of normal time} - MG2 \text{ torque before shifting to the "torque control"}).$$

In the above formula, "i" represents the "current routine", "i−1" represents the "previous routine", "MG2 torque of normal time" represents the "the target torque of the motor generator 3 set in accordance with the opening degree of the accelerator at the termination of the garage shift", "target revolution of MG2" represents the revolution frequency of the motor generator 3 set by the "revolution control" being carried out between the times t2 and t5, and "MG2 torque before shifting to the torque control" represents the torque of the motor generator 3 under the "revolution control", that is, "the torque of the motor generator 3 between the times t2 and t5 in the time chart of FIG. 8". Here, "MG2 torque of normal time" is a preset value set in accordance with the opening degree of the accelerator and the vehicle speed.

Figure 7:
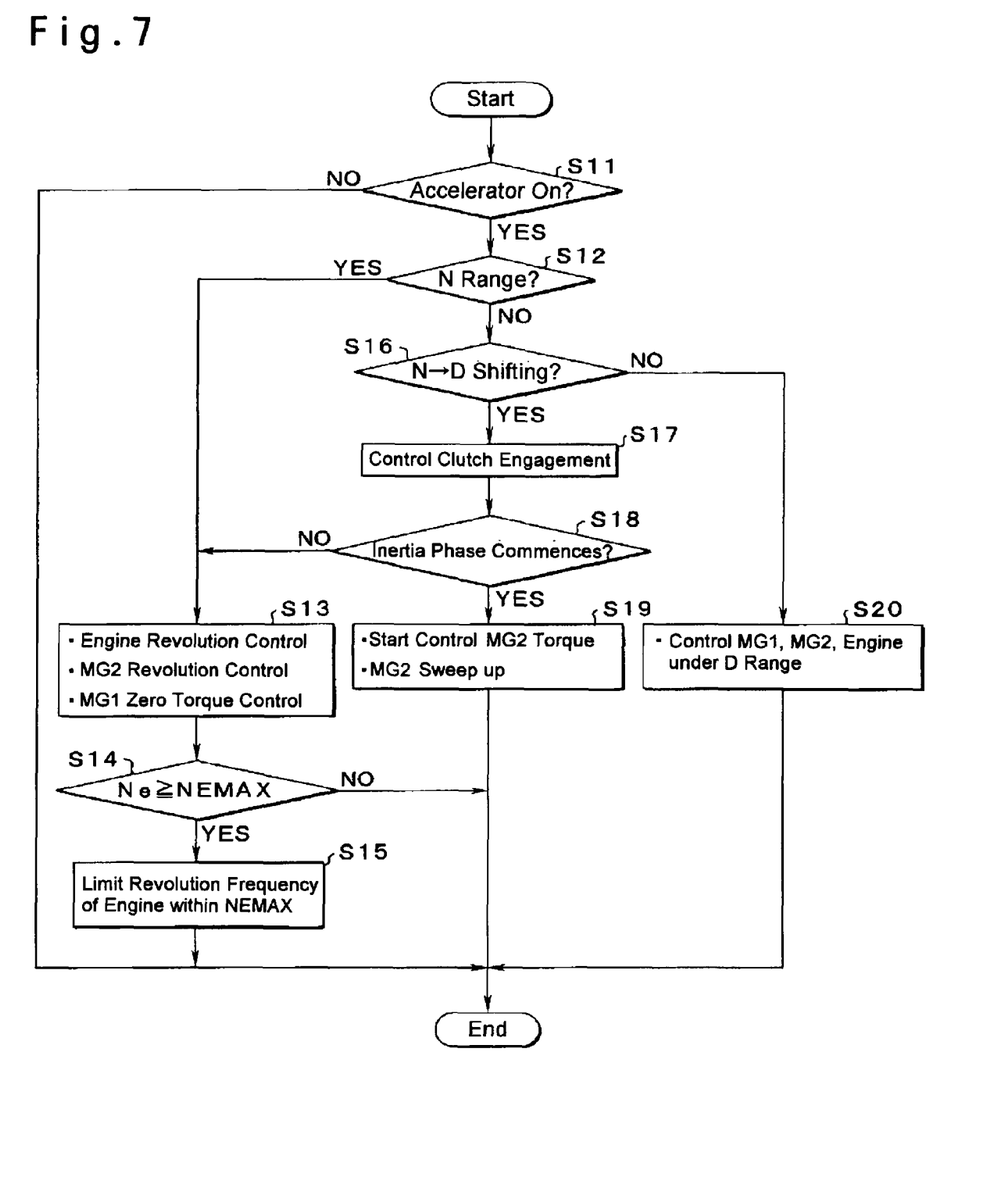
FIG. 7 is a flowchart showing another control method carried out by the control system for drive unit of vehicle of the invention.
Figure 8:
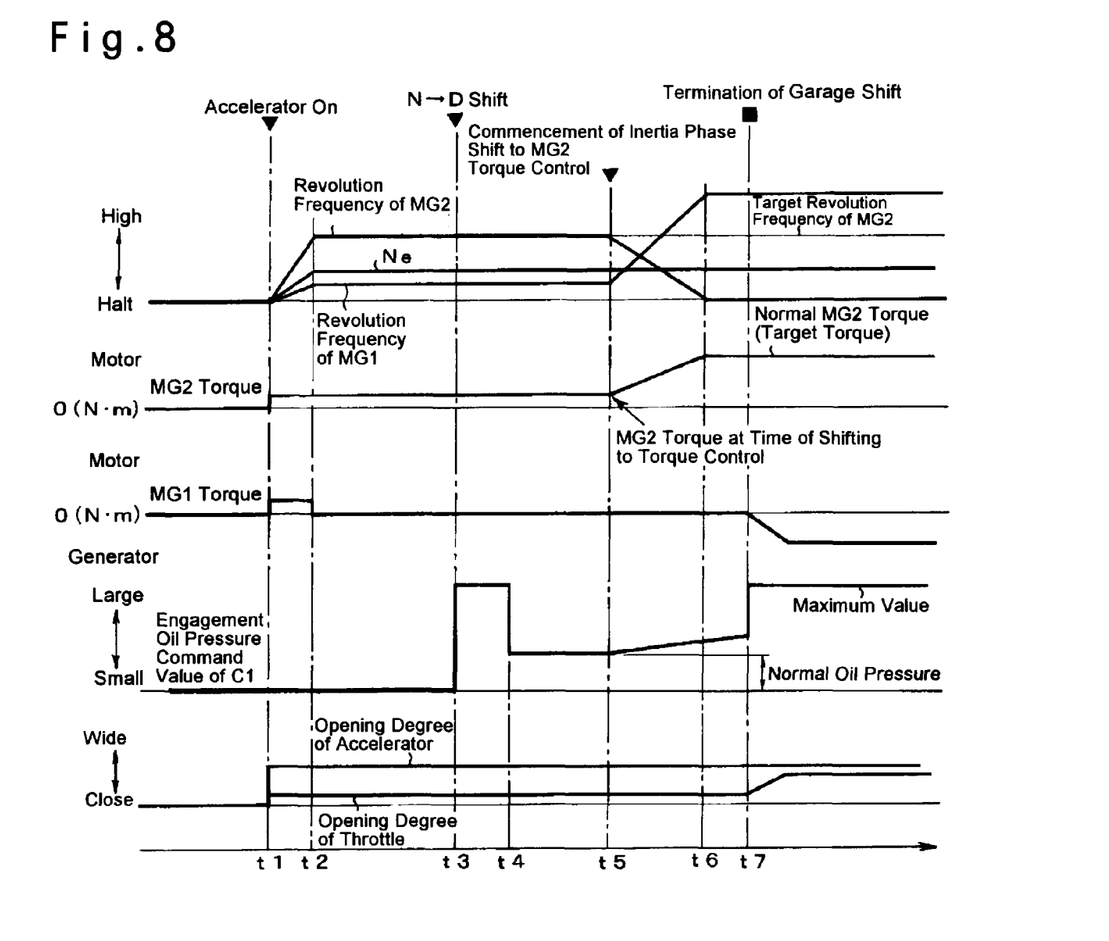
FIG. 8 is a time chart corresponding to the control method shown in FIG. 7.

Thus, according to the control method of FIG. 7, in case the accelerator pedal is stepped on and the shift range or shift position is shifted from N range to D range, the clutch C1 is engaged and the torque of the motor generator 3 is controlled in accordance with the acceleration demand outputted by stepping the accelerator pedal. Therefore, deterioration in a response to transmit the torque to the wheel 5 can be minimized in case the shift range or shift position is shifted from N range to D range. Also, in case the routine advances from Step S12 to Step S13, specifically, in case the accelerator pedal is stepped on and the shift range or shift position is kept to N range, the engine 2 is started. Therefore, it is possible to discriminate from the case in which the accelerator is not stepped on. Moreover, a drive feeling is comparable to a vehicle having a power train without the power distribution mechanism 8. As explained above, the control of the motor generator 3 is shifted to the "torque control", and the torque of the motor generator 3 is raised to be approximated to the target torque to be selected after the termination of the garage shift, after the period when the shift range or shift position is shifted from N range to D range and the inertia phase commences. In addition to this control, the command value to engage the clutch C1 is also increased to achieve the torque capacity capable of transmitting the target torque for the normal time. Therefore, the response in the period from the termination of the garage shift until when the drive force is generated can be improved.

Moreover, since the revolution frequency of the engine 2 is limited in advance within the guard value NEMAX at Step S15, both of the input revolution of the transmission 19 and the revolution frequency of the engine 2 are kept to low speeds even in case the routine advances to Step S17 through step S16 so that the clutch C1 is engaged. Therefore, the revolution frequency of the motor generator 16 can be lowered within the structural upper limit thereof. Further, the revolution frequency of the engine 2 is controlled by controlling the opening degree of the throttle of the engine itself. That is, since the torque of the motor generator 16 is controlled to zero Newtonmeter at Steps S13 and S15, it is impossible to carry out a control carried out at Step S20, i.e., a control to control the revolution frequency of the engine 2 depending on the revolution frequency of the motor generator 16. However, according to this example, it is possible to avoid interference between the control of revolution frequency of the motor generator 3 and the control of revolution frequency of the motor generator 16.

Here will be explained a relation between the example shown in FIGS. 2 and 7 and the present invention. The electronic control unit 36 carrying out the control of Step S13 in FIG. 7 corresponds to the revolution frequency control means and the second torque control means of the invention; the electronic control unit 36 carrying out the control of Step S17 in FIG. 7 corresponds to the torque capacity control means of the invention; the electronic control unit 36 carrying out the control of Step S19 in FIG. 7 corresponds to the first torque control means of the invention; and the electronic control unit 36 carrying out the controls of Steps S13, S14 and S15 in FIG. 7 corresponds to the prime mover starting means of the invention.

Here, according to the control method shown in FIG. 7, not only the shifting from N range to D range, but also a shifting from P range to D range, and a shifting from P range to R range can be judged. Moreover, it is also possible to control the oil pressure of the clutch C2 at Step S17 instead of the clutch C1. Further, the control example of FIG. 7 can also be applied to a case in which the first stage is inhibited when shifting to D range so that the second stage is to be selected. Additionally, according to the control methods of FIGS. 1 and 7, the vehicle control demand can be judged at any time, e.g., before a shifting operation of the shift range, during a shifting operation of the shift range, and after a shifting operation of the shift range. Here, the vehicle control demand before the shifting operation of the shift range or shift position can be judged by tracking back a record of the vehicle control demand before the shifting operation of the shift range or shift position, after the shifting operation of the shift range or shift position.

In the power train illustrated in FIG. 2, although the single pinion type planetary gear mechanism is used as the power distribution mechanism 8, a double pinion type planetary gear mechanism may also be used as the power distribution mechanism. In this case, rotary elements are connected to arrange the engine between two motor generators in a nomographic diagram. It is also possible to use a power distribution mechanism comprising four rotary elements, in which any of those rotary elements is switched to function as an input element, reaction element and an output element selectively. On the other hand, the transmission arranged on the route from the power distribution mechanism to the wheel may also be a geared transmission capable of setting five or more gear stages under D range. Additionally, it is also possible to use a transmission in which the gear stage is controlled by a synchronizer mechanism.

According to the present invention, the definition of the "continuously variable transmission" is a continuously variable transmission, in which a speed change ratio between an input element and an output element can be controlled by controlling an output of a motor generator connected with the reaction element. Here, the torque capacity of this electrical continuously variable transmission will not drop even in the process of controlling the speed change ratio thereof. On the other hand, according to the invention, the definition of the "transmission" is a transmission, which is adapted to control engagement and releasing of the engagement devices (i.e., a clutch and a brake), in other words, which is adapted to switch a power transmission route in case of controlling or shifting a gear stage thereof. Additionally, unlike the electrical continuously variable transmission, the torque capacity of the transmission drops in the process of shifting the gear stage thereof, i.e., in the process of switching or releasing the engagement devices.

In addition to above, the present invention may also be applied to a vehicle having an electric motor or a hydraulic motor, instead of the engine 2 as the second prime mover. Alternatively, the electric motor or the hydraulic motor may also be used as a reaction force establishing device instead of the motor generator 16. Moreover, the electric motor or the hydraulic motor may be used as a prime mover instead of the motor generator 3. Further, a fuel cell system may also be used as an electric power feeding device in addition to the electric storage devices 31 and 33. Furthermore, an electromagnetic type clutch mechanism, a powder type clutch mechanism, a synchromesh type clutch mechanism and so on may also be used instead of the hydraulic type clutch mechanism. Here, according to the invention, the clutch mechanism includes the brake which controls a rotation and cessation of the rotary elements. The control examples shown in the accompanying figures may also be applied to any of a front drive vehicle (or two wheel drive vehicles), in which an engine and two motor generators are connected to front wheels, and a front drive vehicle in which an engine and two motor generators are connected to rear wheels. Further the control examples shown in the accompanying figures may also be applied to a four wheel drive vehicle, in which an engine and two motor generators are connected to both front and rear wheels.

INDUSTRIAL APPLICABILITY

The present invention can be utilized in a field of manufacturing and repairing automobiles such as cars, and in a field of manufacturing and processing parts for automobiles.

The invention claimed is:

1. A control system for a drive unit of a vehicle, in which a prime mover is arranged on a power transmission route from a continuously variable transmission to a wheel, in which a clutch mechanism is arranged on a route from the prime mover to the wheel, and in which a shift range or shift position of a shifting device can be shifted selectively between a drive range or drive position where a motive power can be transmitted through the route from the prime mover to the wheel and a non-drive range or non-drive position where a motive power cannot be transmitted through the route from the prime mover to the wheel, comprising:

a vehicle speed control demand judging means for judging a vehicle speed control demand in case of shifting the shift range or shift position of the shifting device from the non-drive range or non-drive position to the drive range or drive position; and a prime mover control means for controlling a torque of the prime mover on the basis of a judgment of the vehicle speed control demand judging means, wherein the vehicle speed control demand judging means includes a means for judging a braking demand, the prime mover control means includes a means for increasing a torque of the prime mover, and a means for changing a timing of increasing the torque of the prime mover depending on an existence of the braking demand, and the prime mover control means includes a means for accelerating the timing of increasing the torque of the prime mover in case the braking demand is not being outputted, in comparison with the timing of the case in which the braking demand is being outputted.

2. The control system for a drive unit of a vehicle as claimed in claim 1, wherein:

a second prime mover is connected to an input side of the continuously variable transmission.

3. The control system for a drive unit of a vehicle as claimed in claim 2:

wherein the continuously variable transmission comprises an input element connected with the second prime mover, a reaction element connected with a reaction force establishing device, and an output element connected with the prime mover in a power transmittable manner, and those elements are capable of rotating differentially among each other;

wherein a speed change ratio of the continuously variable transmission is varied steplessly by controlling an output of the reaction force establishing device; and comprising a transmission in which a gear stage thereof is controlled by controlling a torque capacity of the clutch mechanism.

4. The control system for a drive unit of a vehicle as claimed in claim 3, wherein the vehicle speed control demand judging means includes a means for judging an acceleration demand on the basis of an opening degree of an accelerator, the control system further comprising:

a revolution frequency control means for controlling a revolution frequency of the prime mover in accordance with the opening degree of the accelerator in case the opening degree of the accelerator is increased prior to shifting the shift range or shift position of the shifting device from the non-drive range or non-drive position to the drive range or drive position;

a first torque control means for controlling the torque of the prime mover for the drive range or drive position in accordance with the opening degree of the accelerator, in case the shift range or shift position of the shifting device is shifted from the non-drive range or non-drive position to the drive range or drive position; and a torque capacity control means for controlling a torque capacity of the clutch mechanism for the drive range or drive position in accordance with the opening degree of the accelerator, in case the shift range or shift position of the shifting device is shifted from the non-drive range or non-drive position to the drive range or drive position.

5. The control system for a drive unit of a vehicle as claimed claim 4, further comprising:

a prime mover starting means for starting the second prime mover in case the opening degree of the accelerator is increased prior to shifting the shift range or shift position of the shifting device from the non-drive range or non-drive position to the drive range or drive position, and controlling the revolution frequency of the prime mover.

6. The control system for a drive unit of a vehicle as claimed in claim 4, wherein:

the revolution frequency control means includes a means for controlling a revolution frequency of the prime mover in accordance with the opening degree of the accelerator.

7. The control system for a drive unit of a vehicle as claimed in claim 6, wherein:

the revolution frequency control means includes a means for controlling a revolution frequency of the second prime mover in accordance with the opening degree of the accelerator.

8. The control system for a drive unit of a vehicle as claimed in claim 5, wherein:

the prime mover starting means includes a means for keeping the revolution frequency of the second prime mover in accordance with the revolution frequencies of the prime mover and the second prime mover, lower than an upper limit guard value for preventing a rise in the revolution frequency of the prime mover.

9. The control system for a drive unit of a vehicle as claimed in claim 5:

wherein the prime mover starting means includes a means for controlling the revolution frequency of the second prime mover by controlling an output of the second prime mover; and further comprising a second torque control means for controlling a torque of the reaction force establishing device to a minimum value during a period from a commencement to a termination of a shifting operation of the shifting device from the non-drive range or non-drive position to the drive range or drive position.

10. The control system for a drive unit of a vehicle as claimed in claim 1, wherein:

the vehicle speed control demand judging means further includes a means for judging the vehicle speed control demand in accordance with an opening degree of an accelerator or the braking demand.

11. The control system for a drive unit of a vehicle as claimed in claim 1, wherein:

the prime mover control means includes a means for raising the torque of the prime mover gradually.

12. The control system for a drive unit of a vehicle as claimed in claim 1, wherein:

the vehicle speed control demand judging means includes a means for judging the vehicle speed control demand wherein the timing of the judgment is at least one of:
before a shifting operation of the shift range or shift position of the shifting device from the non-drive range or non-drive position to the drive range or drive position;
during the shifting operation; and
after a completion of the shifting operation.

13. The control system for a drive unit of a vehicle as claimed in claim 1, wherein:
a transmission is arranged on a power transmission route from the prime mover to the wheel;
the continuously variable transmission includes an electrical continuously variable transmission, in which a speed change ratio thereof is controlled electrically and steplessly; and
the transmission includes a geared transmission, in which a gear stage thereof is changed stepwise.

14. The control system for a drive unit of a vehicle as claimed in claim 13, wherein:
the electrical continuously variable transmission and the geared transmission are connected in tandem so as to input power outputted from any one of those transmissions to the other one.

15. The control system for a drive unit of a vehicle as claimed in claim 13, wherein:
a total speed change ratio of the drive unit is set by both of the electrical continuously variable transmission and the geared transmission.

16. The control system for a drive unit of a vehicle as claimed in claim 13, wherein:
the electrical continuously variable transmission includes a single pinion type planetary gear mechanism comprising a carrier functioning as an input element, a sun gear functioning as a reaction element, and a ring gear functioning an output element.

17. The control system for a drive unit of a vehicle as claimed in claim 13, wherein:
the transmission comprises two sets of planetary gear mechanisms and a plurality of engagement devices; and
the clutch mechanism includes a plurality of engagement devices.

18. The control system for a drive unit of a vehicle as claimed in claim 17, wherein:
the two sets of planetary gear mechanisms include a single pinion type planetary gear mechanism;
the sun gears of a first and a second planetary gear mechanisms are connected with each other, and the carrier of the first planetary gear mechanism and the ring gear of the second planetary gear mechanism are connected with each other; and
the engagement device comprises
a first clutch connecting the ring gear of the first planetary gear mechanism with the output element of the power distribution mechanism selectively,
a second clutch connecting the sun gear of the first planetary gear mechanism and the sun gear of the second planetary gear mechanism with the output element of the power distribution mechanism selectively;
a first brake fixing the sun gears of the first and the second planetary gear mechanisms selectively, and
a second brake fixing the carrier of the second planetary gear mechanisms selectively.

19. A control method for a drive unit of a vehicle, in which a prime mover is arranged on a power transmission route from a continuously variable transmission to a wheel, in which a clutch mechanism is arranged on a route from the prime mover to the wheel, and in which a shift range or shift position of a shifting device can be shifted selectively between a drive range or drive position where a motive power can be transmitted through the route from the prime mover to the wheel and a non-drive range or non-drive position where a motive power cannot be transmitted through the route from the prime mover to the wheel, the method comprising:
judging a vehicle speed control demand in case of shifting the shift range or shift position of the shifting device from the non-drive range or non-drive position to the drive range or drive position;
judging a braking demand; and
controlling a torque of the prime mover on the basis of the judging the vehicle speed control demand, including changing a timing of increasing the torque of the prime mover depending on an existence of the braking demand, and accelerating the timing of increasing the torque of the prime mover in case the braking demand is not being outputted, in comparison with the timing of the case in which the braking demand is being outputted.

20. A control system for a drive unit of a vehicle, in which a prime mover is arranged on a power transmission route from a continuously variable transmission to a wheel, in which a clutch mechanism is arranged on a route from the prime mover to the wheel, and in which a shift range or shift position of a shifting device can be shifted selectively between a drive range or drive position where a motive power can be transmitted through the route from the prime mover to the wheel and a non-drive range or non-drive position where a motive power cannot be transmitted through the route from the prime mover to the wheel, comprising:
a vehicle speed control demand judging device for judging a vehicle speed control demand in case of shifting the shift range or shift position of the shifting device from the non-drive range or non-drive position to the drive range or drive position; and
a prime mover control device for controlling a torque of the prime mover on the basis of a judgment of the vehicle speed control demand judging device, wherein
the vehicle speed control demand judging device includes a controller to determine a braking demand,
the prime mover control device includes a controller to increase a torque of the prime mover, and a controller to change a timing of increasing the torque of the prime mover depending on an existence of the braking demand, and
the prime mover control device includes a controller to accelerate the timing of increasing the torque of the prime mover in case the braking demand is not being outputted, in comparison with the timing of the case in which the braking demand is being outputted.

21. The control system for a drive unit of a vehicle as claimed in claim 1, wherein:
the means for accelerating the timing of increasing the torque of the prime mover increases a rate at which the torque of the prime mover is increased in the case the braking demand is not being outputted, in comparison with a rate at which the torque of the prime mover is increased in the case the braking demand is being outputted.

* * * * *